(12) United States Patent
Du et al.

(10) Patent No.: US 8,848,160 B2
(45) Date of Patent: Sep. 30, 2014

(54) DISPLAY SCREEN AND ELECTRONIC DEVICE USING SAME

(75) Inventors: Qi-Jian Du, ShenZhen (CN); Chwan-Hwa Chiang, New Taipei (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 533 days.

(21) Appl. No.: 13/169,770

(22) Filed: Jun. 27, 2011

(65) Prior Publication Data
US 2012/0229752 A1 Sep. 13, 2012

(30) Foreign Application Priority Data
Mar. 11, 2011 (CN) .......................... 2011 1 0058471

(51) Int. Cl.
*G02F 1/13* (2006.01)
*G02B 5/30* (2006.01)
*G02B 27/28* (2006.01)

(52) U.S. Cl.
CPC ............ *G02B 27/283* (2013.01); *G02B 5/3016* (2013.01)
USPC .......................................................... 349/194

(58) Field of Classification Search
None
See application file for complete search history.

(56) References Cited

U.S. PATENT DOCUMENTS 7,652,736 B2 * 1/2010 Padiyath et al. .............. 349/115

* cited by examiner

*Primary Examiner* — Sarah Hahm
(74) *Attorney, Agent, or Firm* — Novak Druce Connolly Bove + Quigg LLP

(57) ABSTRACT

A display screen includes a substrate comprising a first surface and a second surface opposite to the first surface; a beam-splitting polarizer formed on a first surface of the substrate; and a non-conductive metal layer formed on a second surface of the substrate. The beam-splitting polarizer is a cholesterol liquid crystalline polarization layer.

18 Claims, 3 Drawing Sheets

DISPLAY SCREEN AND ELECTRONIC DEVICE USING SAME

BACKGROUND

1. Technical Field

The exemplary disclosure generally relates to display screens and electronic devices with the display screens.

2. Description of Related Art

A typical mobile electronic device has a display system for displaying digital information, images, or graphs. The display system includes a display element and a display screen. The display screen covers the display element to protect the display element from damage. The display screen is usually made of a transparent material, such as resin or glass. When the display element is actuated, users can view the light that is transmitted through the display screen. To improve the appearance of the display screen, a metal layer is typically formed on the display screen. However, typical display screens formed with a metal layer have a low transparence, thus the display screens with metallic luster cannot be obtained.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary embodiment of a display screen and electronic device using the display screen. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
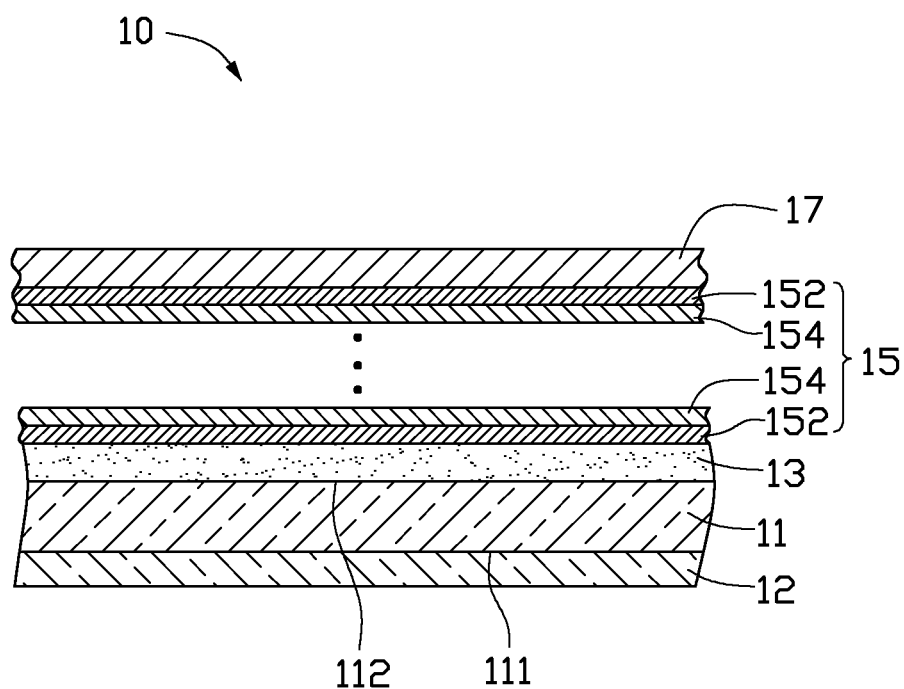
FIG. 1 illustrates a cross-sectional display of an embodiment of a display screen.
Figure 2:
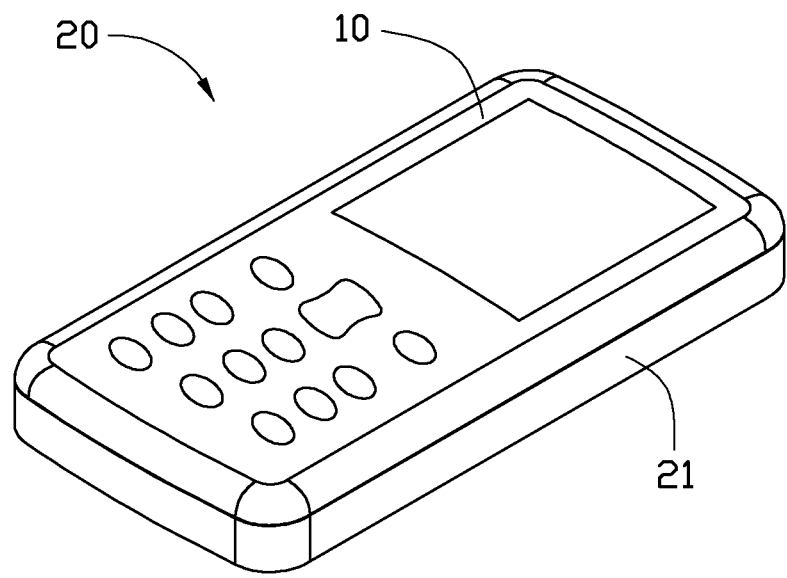
FIG. 2 is a perspective display of an electronic device using the display screen in FIG. 1.

Referring to FIGS. 1 and 2, in a present embodiment, an electronic device 20 includes a display screen 10 and a housing 21 for receiving and fixing the display screen 10. The display screen 10 is embedded into the housing. Light transmitted from a display unit (not shown) under the display screen 10 may pass through the display screen 10 and be viewed by the users.

The display screen 10 includes a substrate 11, a beam-splitting polarizer 12 formed on a first surface 111 of the substrate 11. A paint layer 13 formed on a second surface 112 of the substrate 11 opposite to the first surface 111, a non-conductive metal layer 15 formed on the paint layer 13, and a protection layer 17 formed on the non-conductive metal layer 15.

The substrate 11 may be molded from a transparent thermoplastic material, such as Polycarbonate (PC), Polymethyl Methacrylate (PMMA), Polyamide (PA), or any combination thereof. The substrate 11 further may be made of glass or ceramic.

The beam-splitting polarizer 12 is a cholesterol liquid crystalline polarization layer. The beam-splitting polarizer 12 may be formed by sputtering cholesterol liquid crystalline polymer, and has a thickness between 10 micrometers and 90 micrometers. The beam-splitting polarizer 12 can improve a light transmission rate of the display screen 10 between 10% and 70%. The beam-splitting polarizer 12 can transmit a light having a wavelength between 400 nanometers and 750 nanometers.

The paint layer 13 may be formed by acrylic resin paint. The paint layer 13 can enhance the binding force between the non-conductive metal layer 15 and the substrate 11. The paint layer 13 has a thickness between 5 micrometers and 20 micrometers.

The non-conductive metal layer 15 may be formed by vacuum sputtering process. The non-conductive metal layer 15 is insulative thereby not affecting the electronic device transmitting/receiving radio frequency. When the display unit under the display screen 10 is off, the non-conductive metal layer 15 has a reflectivity of 30%-50%, which causes the display screen 10 to have a metallic luster appearance. When the display unit under the display screen 10 is on, the non-conductive metal layer 15 has a transmittance of 50%-70%. The non-conductive metal layer 15 includes alternating niobium oxide layers 152 and aluminum oxide layers 154. The total number of the niobium oxide layers 152 and aluminum oxide layers 154 may be 5 or 7. The non-conductive metal layer 15 contacts with the paint layer 13 may via one niobium oxide layer 152. The non-conductive metal layer 15 contacts with the protection layer may also via one niobium oxide layer 152.

The protection layer 17 is transparent and has a thickness between 10 micrometers and 30 micrometers. In an exemplary embodiment, the protection layer 17 is formed by acrylic resin paint. In another exemplary embodiment, the protection layer 17 may be formed by acrylic resin paint with pigment to decorate the display screen 10.

Figure 3:
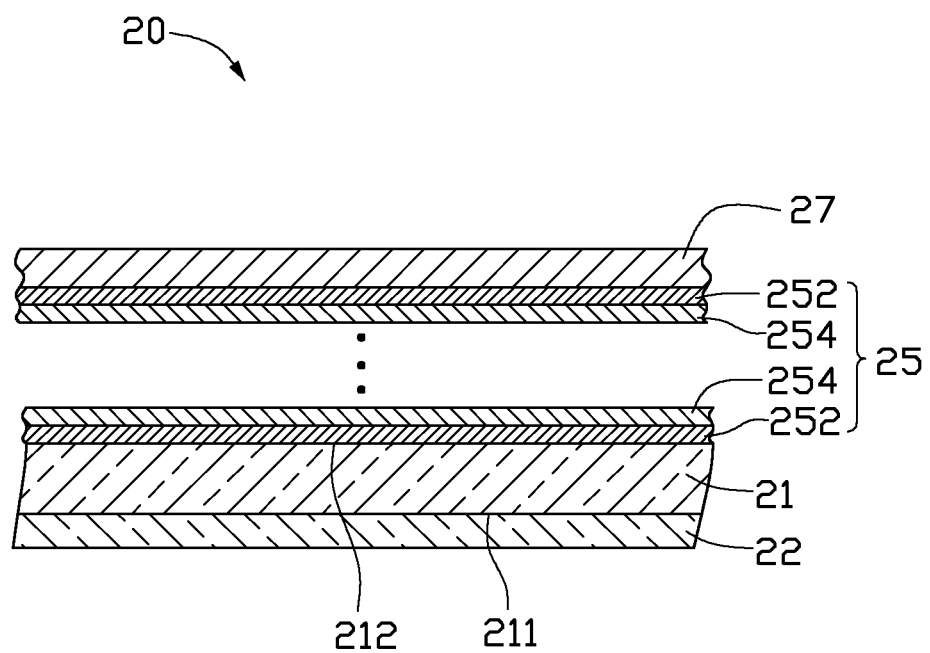
FIG. 3 illustrates a cross-sectional display of another embodiment of a display screen.

Referring to FIG. 3, another exemplary embodiment of a display screen is illustrated. The display screen 20 includes a substrate 21, a beam-splitting polarizer 22 formed on a first surface 211 of the substrate 21, a non-conductive metal layer 25 directly formed on a second surface 112 of the substrate 21 opposite to the first surface 211, and a protection layer 27 formed on the non-conductive metal coating 25. The non-conductive metal layer 25 includes alternating niobium oxide layers 252 and aluminum oxide layers 254.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A display screen, comprising:
   a substrate comprising a first surface and a second surface opposite to the first surface;
   an beam-splitting polarizer formed on a first surface of the substrate, the beam-splitting polarizer comprising a cholesterol liquid crystalline polarization layer; and
   a non-conductive metal layer formed on a second surface of the substrate;
   wherein the non-conductive metal layer comprise alternating niobium oxide and aluminum oxide layers.

2. The display screen as claimed in claim 1, wherein the beam-splitting polarizer has a thickness between 10 micrometers and 90 micrometers.

3. The display screen as claimed in claim 1, wherein the beam-splitting polarizer transmits a light having a wavelength between 400 nanometers and 750 nanometers.

4. The display screen as claimed in claim 1, further comprising an acrylic resin paint layer formed between the second surface and the non-conductive metal layer.

5. The display screen as claimed in claim 4, wherein the paint layer has a thickness between 5 micrometers and 20 micrometers.

6. The display screen as claimed in claim 1, wherein the total number of the niobium oxide and aluminum oxide layers is 5 or 7.

7. The display screen as claimed in claim 1, wherein the non-conductive metal layer contacts with the paint layer via one niobium oxide layer.

8. The display screen as claimed in claim 1, wherein the display screen further comprising a protection layer, the protection layer is transparent and has a thickness between 10 micrometers and 30 micrometers.

9. The display screen as claimed in claim 1, wherein the display screen further comprising a protection layer, the protection layer is formed by acrylic resin paint.

10. The display screen as claimed in claim 1, wherein the display screen further comprising a protection layer, the protection layer is formed by acrylic resin paint with pigment.

11. The display screen as claimed in claim 1, wherein the beam-splitting polarizer is formed by sputtering cholesterol liquid crystalline polymer.

12. An electronic device, comprising:
   a housing; and
   a display screen comprising:
      a substrate comprising a first surface and a second surface opposite to the first surface;
      an beam-splitting polarizer formed on a first surface of the substrate; and
      a non-conductive metal layer formed on a second surface of the substrate, the beam-splitting polarizer formed by sputtering cholesterol liquid crystalline polymer;
      wherein the non-conductive metal layer comprise alternating niobium oxide and aluminum oxide layers.

13. The electronic device as claimed in claim 12, wherein the beam-splitting polarizer has a thickness between 10 micrometers and 90 micrometers.

14. The electronic device as claimed in claim 12, wherein the beam-splitting polarizer transmits a light having a wavelength between 400 nanometers and 750 nanometers.

15. The electronic device as claimed in claim 12, further comprising an acrylic resin paint layer formed between the second surface and the non-conductive metal layer.

16. The electronic device as claimed in claim 15, wherein the paint layer has a thickness between 5 micrometers and 20 micrometers.

17. The electronic device as claimed in claim 12, wherein the total number of the niobium oxide and aluminum oxide layers is 5 or 7.

18. The electronic device as claimed in claim 12, wherein the non-conductive metal layer contacts with the paint layer via one niobium oxide layer.

\* \* \* \* \*